A. C. EASTWOOD & J. F. SCHNABEL.
CONTROL SYSTEM FOR ELECTRIC MOTORS.
APPLICATION FILED MAR. 18, 1910.
984,651.
Patented Feb. 21, 1911.
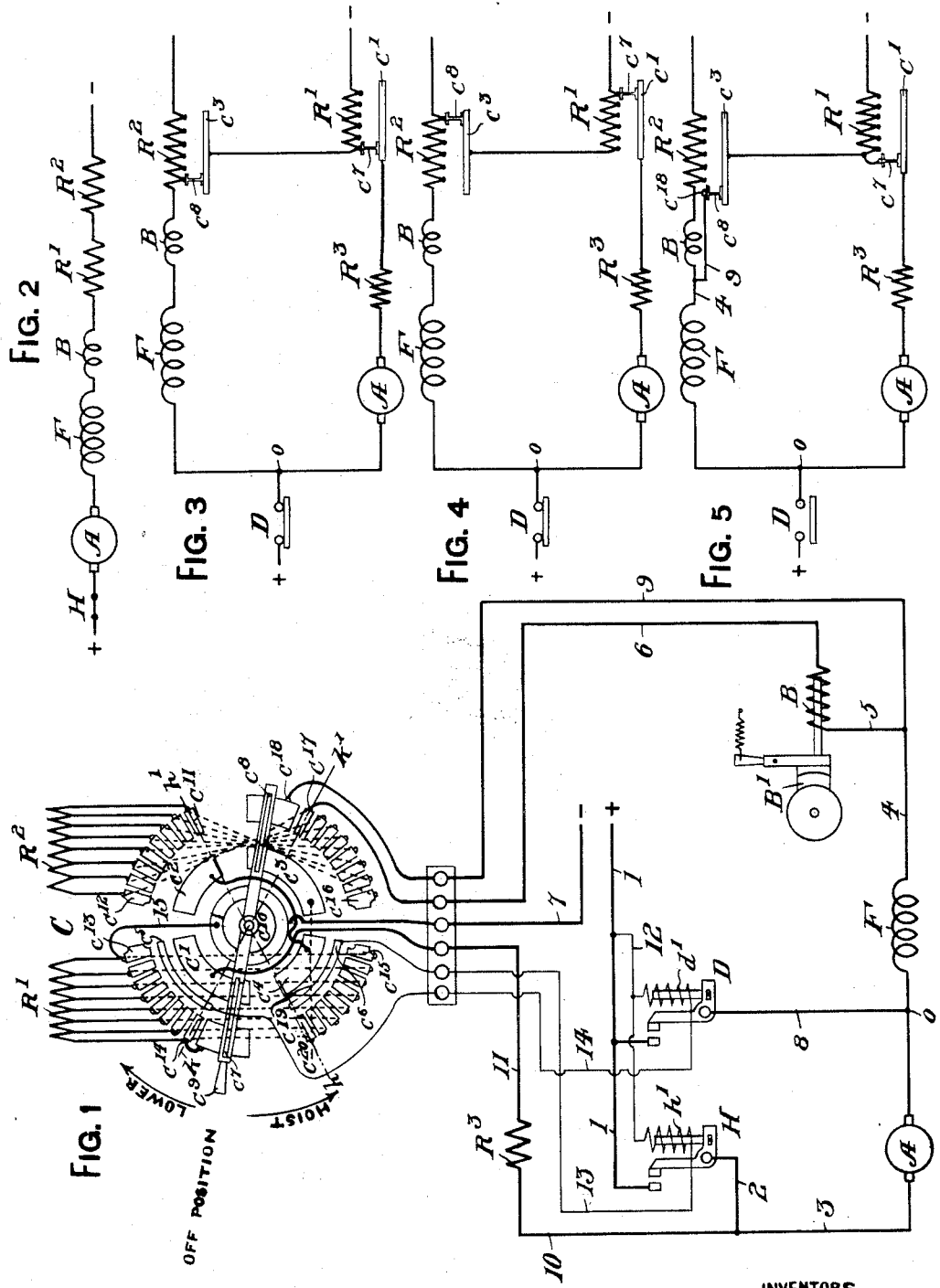

UNITED STATES PATENT OFFICE.

ARTHUR C. EASTWOOD AND JAMES F. SCHNABEL, OF CLEVELAND, OHIO, ASSIGNORS TO THE ELECTRIC CONTROLLER AND MANUFACTURING COMPANY, OF CLEVELAND, OHIO, A CORPORATION OF OHIO.

CONTROL SYSTEM FOR ELECTRIC MOTORS.

984,651. Specification of Letters Patent. Patented Feb. 21, 1911.

Application filed March 18, 1910. Serial No. 550,209.

*To all whom it may concern:*

Be it known that we, ARTHUR C. EASTWOOD and JAMES F. SCHNABEL, citizens of the United States, both residing at Cleveland, in the county of Cuyahoga and State of Ohio, have invented or discovered new and useful Improvements in Control Systems for Electric Motors, of which the following is a specification.

Our invention relates to systems for controlling electric motors and its object is to provide a system of control in which slow speeds in the lowering of heavy loads may be obtained without wasting current. Preferably we connect the armature and field windings in parallel circuits, the motor circuit being connected to the source of current supply at all times when it is desired to move the load. In obtaining slow speeds, the armature and field windings are connected in a dynamic braking circuit of low resistance. Increase of speed is obtained in lowering preferably by inserting resistance in the field circuit, cutting resistance out of the armature circuit, and inserting resistance in the dynamic braking circuit.

Referring to the accompanying drawings, Figure 1 is a diagram showing the condition when the master switch is in the off-position, and Figs. 2, 3, 4, and 5 are simplified diagrams of the motor circuits when the master switch is, respectively, in the first hoisting position, the first lowering position, the final lowering position, and the off-position.

On the drawings, we have shown in conventional form the armature A, the series field F, the magnetic brake B′, with its actuating winding B, the magnetic switches D and H, the resistances R′ and R² and the master-switch or controller for varying the amount of these resistances in the motor circuit or circuits, and the various connections between these several elements. The construction and the connection of the various parts will be understood from the description of the operation thereof.

To hoist a load, the arm $c^9$ of the master controller C is moved to the first position in the hoisting direction, at which time the brush $c^7$ connects the contacts $c^4$, $c^6$, and $c^{20}$, and the brush $c^8$ connects the contacts $c^2$ and $c^{11}$. The switch H is now caused to close, its solenoid $h′$ being energized through the following circuit: from the positive through the wires 1 and 12, the solenoid winding $h′$, the wire 13, the contact $c^6$, the brush $c^7$, the contact $c^{20}$, the cross-connection to the contact $c^{14}$, the resistance R′, the contact $c^{13}$ the wire 15, the blowout coil $c^{10}$, and the wire 7 to the negative. As soon as the switch H closes, the motor circuit is as follows: from the positive through the wire 1, the switch H, the wires 2 and 3, the armature from left to right, the field F, the wires 4 and 5, the brake coil B, the wire 6, the contact $c^{17}$, the cross-connection to the contact $c^{12}$, the resistance R², the contact $c^{11}$, the brush $c^8$, the contact $c^2$, the cross connection to the contact $c^4$, the brush $c^7$, the contact $c^{20}$, the cross-connection to the contact $c^{14}$, the resistance R′, the wire 15, the blowout coil $c^{10}$, and the wire 7 to the negative. This circuit is shown in Fig. 2, the resistances R′ and R² being in series with the armature and field.

In the hoisting direction the motor is controlled by plain rheostatic control. To increase the speed, the resistances R′ and R² are gradually cut-out until the last position is reached, when the armature is connected in series with its field across the supply mains. It is understood that, as soon as the switch H closes, establishing the motor circuit, the current through the brake winding B releases the brake, allowing the motor and the mechanism driven by it to rotate.

When it is desired to stop the motor the controller handle $c^9$ is moved to the off-position, the resistances R′ and R² being gradually inserted in series with the motor, tending to slow it down, and finally rupturing this circuit, causing the brake coil to be deenergized, which allows the brake to set. As soon as the motor ceases to drive the load, the brake B′ sets and prevents the load from descending.

To start the load down the controller handle $c^9$ is moved to the first position in the lowering direction, at which time the brush $c^7$ connects the contacts $c′$, $c^5$, and $c^{14}$, and the brush $c^8$ connects the contacts $c^3$ and $c^{17}$.

The switch D is at once closed due to the energizing of its solenoid winding $d′$ through the following circuit: from the positive through the wires 1 and 12, the solenoid winding $d′$, the wire 14, the contact $c^5$, the brush $c^7$, the contact $c^{14}$, the resistance R′, the wire 15, the blowout coil $c^{10}$, and the wire 7 to the negative. The closing of the switch D establishes the following motor connections: from the positive through the wire 1, the switch D, and the wire 8 to the point O between the armature and the series field. Here the current divides into two parallel branches, the branch through the series field passing from the point O through the field F in the same direction as in hoisting, and then through the wires 4 and 5, the brake winding B, the wire 6, the contact $c^{17}$, the brush $c^8$, the contact $c^3$, the cross connection $c^{19}$, the contact $c^{20}$, and the cross connection to the contact $c^{14}$. Here the current is joined by the current through the armature branch, which passes from the point O through the armature from right to left, which is opposite to that while in hoisting, and then through the wires 3 and 10, the resistance $R^3$, the wire 11, the contact $c'$, and the brush $c^7$ to the contact $c^{14}$, whence the current from the two branches passes through the resistance $R'$, the wire 15, the blowout coil $c^{10}$, and the wire 7 to the negative. This connection is shown in simplified diagram Fig. 3.

The resistance $R^3$ is inserted in the armature branch of the circuit for a number of reasons. The motor would operate without this resistance but if the operator should move the arm $c^9$ of the controller quickly toward the full-on position, the armature branch of the parallel circuit would be of much lower resistance than the field branch; consequently, until the armature reached a speed to provide a back electromotive force, the greater portion of the current would pass through the armature branch, thus depriving the field of the required ampere turns to produce a torque sufficient to start the load, and at the same time permitting insufficient current to flow through the brake winding to hold the brake released. Another function of the resistance $R^3$ is as follows: The solenoid winding $d'$ gets its negative connection through the resistance $R'$; as soon as the motor current is established, the drop in voltage across this resistance will be great enough to drop out the switch D. If, however, the resistance $R^3$ is placed in the armature circuit, the coil $d'$ on the first point of the controller is connected across this resistance in series with the armature, and sufficient voltage is obtained, due to the resistance $R^3$, to hold the switch D closed. If on the first point the resistances are so proportioned as to allow approximately full load current to flow through the armature and the field circuits, the motor will start to lower the load, the brake being released by the current through the field circuit. It will be noticed at this point, and by reference to Fig. 3, that the armature and field of the motor are connected in a local dynamic braking circuit including only the small resistance $R^3$; or, in other words, the armature and the resistance $R^3$ are shunted by the field, and the brake coil. Due to this low resistance shunt, the speed of lowering on the first point is very slow under any condition of load. If the load is comparatively light and not sufficient in weight to overhaul the motor, it will be necessary to supply power to the motor to drive the load down. Current then passes (Fig. 3) from the positive through the switch D, through the field winding F and the brake B, and also in parallel through the armature A and the resistance $R^3$, the current through the switch D being the sum of the currents in the two branches of the parallel circuits, which insures the operation of the said switch.

If the load is comparatively heavy and sufficient to overcome the friction of the hoisting mechanism and drive the motor as soon as the brake is released, the motor will act as a generator under a separately excited field. The current through the armature will oppose that passing through it from the line, and this current from the armature can be considered as flowing through the field circuit. The current through the field will be a certain definite amount since it is connected across the line through a resistance, and the current generated by the armature will supply part of this current, the remainder being supplied from the line through the switch D. If the load on the hoist is sufficient to generate a current in the armature greater than the current required in the field circuit, the surplus will be charged back into the line through the switch D. If the controller arm is then moved toward the full on position, the resistance $R^2$ is gradually inserted in the field branch of the parallel path, which causes a weakening of the field and a resultant increase in speed. At the same time, the resistance $R'$ is gradually cut out of the armature circuit and included in the shunting, or dynamic braking, circuit, until at the last position of the master switch arm $c^9$ the armature is connected directly across the line in series only with the resistance $R^3$, while the field is connected directly across the line in series with the resistances $R^2$ and $R'$. The connections of the motor circuit for the last position of the arm $c^9$ are shown in simplified form in Fig. 4. If it is now desired to stop the load the controller arm $c^9$ is moved to the off-position and the slowing down of the motor is caused by including the resistance $R'$ in series with the armature, removing the resistances $R'$ and $R^2$ from the field and dynamic braking circuits. The change in the speed is while stopping, therefore, accomplished rapidly. When the off-position is reached, it will be noticed that the motor circuit is not opened, but that the source of supply is cut off by the opening of the switch D; and that the brake winding B is cut out of the dynamic braking circuit by the wire 9, the contact $c^{18}$, and the brush $c^8$, as clearly shown on Figs. 1 and 5, allowing the brake to set and assist in stopping the load and afterward to hold it. The armature and field are connected in a closed dynamic braking circuit, including the resistance $R^3$.

It will be noticed that, at all times while lowering the load, the motor is connected in a dynamic braking circuit so that, in the case of a failure of voltage in the supply mains which would cause the switch D to open, the motor is still under the control of the operator and he can regulate its speed by changing the resistances $R'$ and $R^2$, regardless of whether the supply mains are connected to the motor circuit or not. In case of failure of any of the wires in the dynamic braking circuit, the brake winding B will be deënergized and the brake will operate to stop the motor. The operator can at all times produce this result by bringing the controller arm $c^9$ to the off-position. It is, therefore, seen that an element of safety is introduced in this system of control by which the hoisting mechanism, including the motor, is prevented from attaining too high a speed, even though no mechanical brake is used. It is intended that the braking force will be supplied within the motor itself for regulating the speeds in lowering, and that the friction brake with the winding B will normally operate merely as a holding brake to prevent the load from descending after it has been stopped. The brake B' will be called upon also to furnish the braking force to slow down the motor and stop it, only when some of the connections are destroyed by accidental causes.

We do not limit our invention to series wound motors or brakes, nor to any definite type of controller, nor to other details and combinations thereof unless required by the prior art or by language in the claims which permits of no other construction.

We claim—

1. In a motor control system, a motor having a field and an armature, two resistances, means connecting one terminal of the armature to one terminal of the field, one resistance being connected to the other terminal of the field, means connecting one end of the other resistance to various points on the first resistance, and means for connecting the other terminal of the armature to various points on the second resistance.

2. In a motor control system, a motor having a field and an armature, two resistances, means connecting one end of one resistance to the field winding, and means connecting one end of the second resistance to various points on the first resistance and one terminal of the armature to various points on the second resistance.

3. In a motor control system, a motor having a field and an armature, means connecting the armature and field in parallel branches, a resistance connected to the source of supply in series with the said parallel branches, and means for inserting said resistance and a second resistance in the field branch.

4. In a motor control system, a motor having a field and an armature, means connecting one terminal of the armature to one terminal of the field and to one side of the source of current supply, a resistance connected to the remaining terminals of the armature and the field and to the other side of the source of supply, a second resistance, and means for inserting both resistances in the field circuit.

5. In a motor control system, a switch mechanism, a resistance, a motor having a field and an armature, means governed by the switch mechanism and connecting the field to a source of supply with the resistance in series therewith, a shunt around the field containing the armature, an additional resistance, and means governed by the switch mechanism for inserting the additional resistance in series with the field and simultaneously decreasing the resistance in the shunt circuit.

6. In a motor control system, a switch mechanism, a resistance, a motor having a field and an armature, means governed by the switch mechanism and connecting the field to a source of supply in series with the resistance, a shunt around the field including the armature, an additional resistance, and means governed by the switch mechanism for gradually inserting the additional resistance in the field circuit.

7. In a motor control system, a motor having a field and an armature, a resistance, a switch mechanism and connections for initially connecting the field and the armature across the source of supply in series with the said resistance, there being a low resistance shunt on the armature, said shunt including the field, an additional resistance connected to the field circuit, and means for simultaneously decreasing the amount of the first resistance in the armature circuit and increasing the amount of the additional resistance in the field circuit as the switch mechanism is moved toward the full-on position.

8. In a motor control system for an electric hoist, a motor having a field and an armature, a controller and connections for initially connecting the armature and the series field of the motor to the source of supply in series with each other and with a high resistance to cause the armature to rotate in the hoisting direction, and connections for connecting the armature and the field in parallel paths of low resistance to the source of supply in series with a resistance at the initial lowering point of the controller to cause the armature to rotate in the opposite direction, and means for simultaneously decreasing the resistance between the armature and the source of supply, and increasing the resistance between the field and the source of supply as the controller is moved toward the full on position.

Signed at Cleveland, Ohio, this 16th day of March, A. D., 1910.

ARTHUR C. EASTWOOD.
JAMES F. SCHNABEL.

Witnesses:
J. H. HALL,
H. M. DIEMER.